United States Patent [19]
Wilson et al.

[11] Patent Number: 5,293,639
[45] Date of Patent: Mar. 8, 1994

[54] REDUCTION OF POWER CONSUMPTION IN A PORTABLE COMMUNICATION UNIT

[75] Inventors: Alan L. Wilson, Hoffman Estates, Ill.; David L. Muri; Tony R. Branch, both of Sunrise, Fla.

[73] Assignee: Motorola, Inc., Schaumburg, Ill.

[21] Appl. No.: 28,530

[22] Filed: Mar. 9, 1993

Related U.S. Application Data

[63] Continuation-in-part of Ser. No. 743,539, Aug. 9, 1991, abandoned.

[51] Int. Cl.⁵ .............................................. H04B 1/40
[52] U.S. Cl. ...................................... 455/17; 455/54.1; 455/69; 455/77; 455/89; 455/127; 455/343
[58] Field of Search ................. 455/13.4, 20, 34.1, 455/34.2, 54.1, 54.2, 67.3, 67.4, 69, 77, 88, 89, 127, 343, 17; 375/58

[56] References Cited

U.S. PATENT DOCUMENTS

| | | | |
|---|---|---|---|
| 3,962,553 | 6/1976 | Linder et al. | 455/36.1 |
| 4,181,893 | 1/1980 | Ehmke | 455/343 |
| 4,309,771 | 1/1982 | Wilkens | 375/58 |
| 4,370,753 | 1/1983 | Ehmke | 455/38.3 |
| 4,381,552 | 4/1983 | Nocilini et al. | 364/707 |
| 4,398,192 | 8/1983 | Moore et al. | 340/825.44 |
| 4,613,990 | 9/1986 | Halpern | 455/54.1 |
| 4,647,793 | 3/1987 | Davis | 307/270 |
| 4,755,816 | 7/1988 | DeLuca | 340/825.44 |
| 4,804,954 | 2/1989 | Macnak et al. | 340/825.44 |
| 5,001,776 | 3/1991 | Clark | 455/226.2 |
| 5,003,619 | 3/1991 | Morris et al. | 455/127 |
| 5,204,970 | 4/1993 | Stengl et al. | 455/69 |
| 5,220,678 | 6/1993 | Feei | 455/69 |

*Primary Examiner*—Reinhard J. Eisenzopf
*Assistant Examiner*—Andrew Faile
*Attorney, Agent, or Firm*—Susan L. Lukasik; Steven G. Parmelee

[57] ABSTRACT

Power consumption in a portable communication unit (101) is reduced by first transmitting at a first time, a message (701) at a first transmit power level to a repeater (103) on a first communication channel. At a second time the message (701) is repeated (903) by the repeater on a second communication channel, thereby transmitting a delayed message (703). The portable communication unit (101) tunes (807) to the second communication channel after transmitting all of the message (701), so as to receive at least part of the delayed message (703). The repeater (103) establishes a receive quality metric (705) for the message (701) and transmits (909) the receive quality metric after all of the delayed message (703) is transmitted. The portable communication unit receives and stores (809) the receive quality metric (705), and determines a second transmit power level for transmitting another message using the receive quality metric.

20 Claims, 4 Drawing Sheets

REDUCTION OF POWER CONSUMPTION IN A PORTABLE COMMUNICATION UNIT

This is a continuation-in-part of application Ser. No. 07/743,539, filed Aug. 9, 1991 and now abandoned.

FIELD OF THE INVENTION

This invention relates to battery saving mechanisms, including but not limited to battery saving functions for a portable transceiver in a digital communication system.

BACKGROUND OF THE INVENTION

RF communications exist. These communications incorporate portable communication units ("portables") that are powered by rechargeable batteries to enable communications in various locations without requiring an external power supply. Unfortunately, after several hours of use, the battery discharges and must be recharged or replaced with a charged battery.

Several techniques for providing a battery-saving system for portables are known. One such system employs a push-to-talk (PTT) circuit wherein the transmitter of the portable is manually keyed by a push button or the like when it is desired to transmit a message, the transmitter normally being unkeyed when no message is being transmitted. Full-duplex systems may utilize voice activation circuits to key the transmitter only while the user is speaking. Other systems apply synchronization codes and tone codes to enable the unit to operate in a low-power consumption mode when not engaged in a call.

In full-duplex cellular systems, cellular telephones adjust their transmit power level continuously in response to commands from the infrastructure. By reducing the transmitter whenever possible in this way, battery charge is conserved. These power-level commands are received on a separate dedicated supervisory channel. In many conventional communications systems, communication channels are a sparse commodity, and the use of a dedicated channel to convey power-level commands is too expensive a price to pay for battery savings in a portable.

Accordingly, a method of providing battery savings that extends battery usage time in a portable unit without use of an additional channel is desired.

DESCRIPTION OF A PREFERRED EMBODIMENT

The following describes a communication protocol that provides battery savings in a portable unit. Based on communications between a portable communication unit, such as a portable radio, and another communication unit, such as a base station or another portable radio, information is developed and exchanged allowing the portable to transmit at a lower transmit power level based on signal quality measurements by both units. Hence, the transmitter is keyed at a lower power level, thus using less current and saving precious battery charge.

Figure 1A:
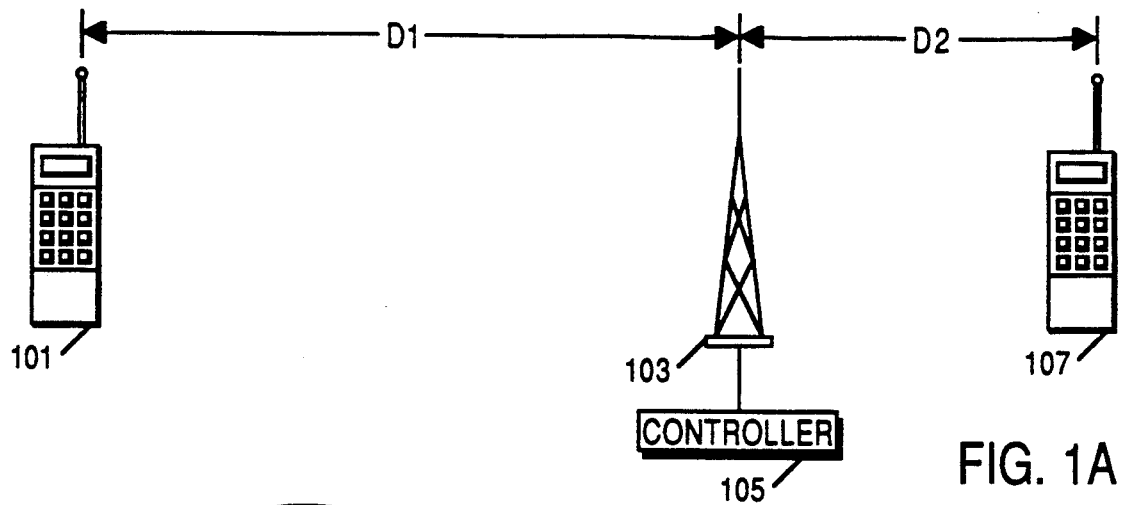
FIG. 1A is a block diagram of a communications system in accordance with the invention.

In this system, information is relayed between communication units. In FIG. 1A, a portable unit 101 is a distance D1 from an antenna with a local base station 103. Another portable unit 107 is a distance D2 from the base station 103, where D1 is significantly greater than D2. A system controller 105 is connected to the base station 103 to control communications in the system, as well understood in the art. Communications can occur directly from one unit 101 to the other unit 107 if the units are close enough, or indirectly when one unit 101 transmits to the base station 103 which repeats the message to the other unit 107, as is known in the art.

Figure 1B:
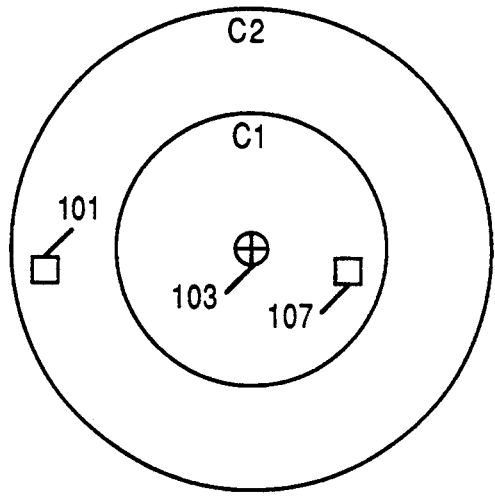
FIG. 1B is a block diagram of a top plan representative view of a communications system in accordance with the invention.

Referring now to FIG. 1B, portable 107 is closer to the base station 103 than is portable 101. Contour C1 encloses an area covered by the base station 103 where strong signal communication is possible between the base station 103 and units located within this area. The area between contour C1 and contour C2 encloses an area covered by the base station 103 where weak signal communication is possible between the base station 103 and units located in the latter area. Although only two contours are shown for this system, the concepts taught by the present invention are readily extended to three or more contours, using bit error rates and/or received signal strength values to define the boundaries of the contours.

Figure 2:
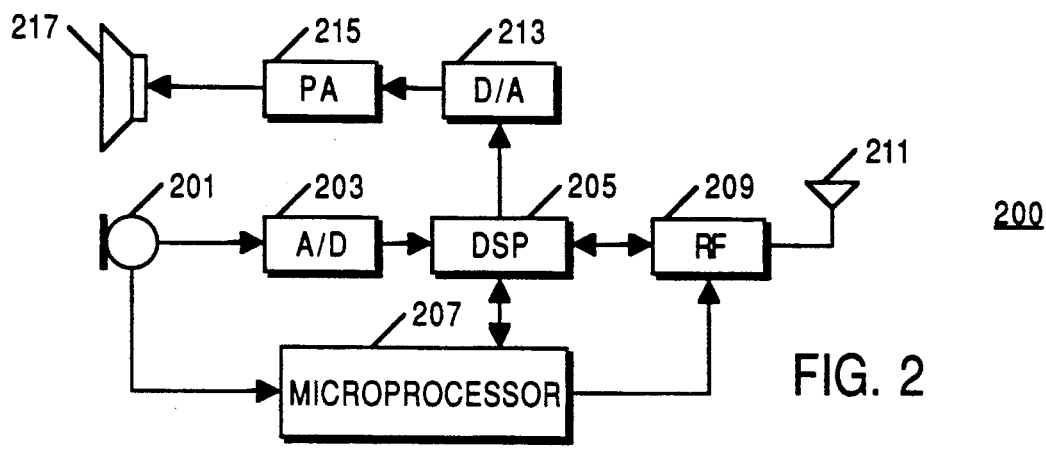
FIG. 2 is a block diagram of a portable communication unit in accordance with the invention.
Figure 3:
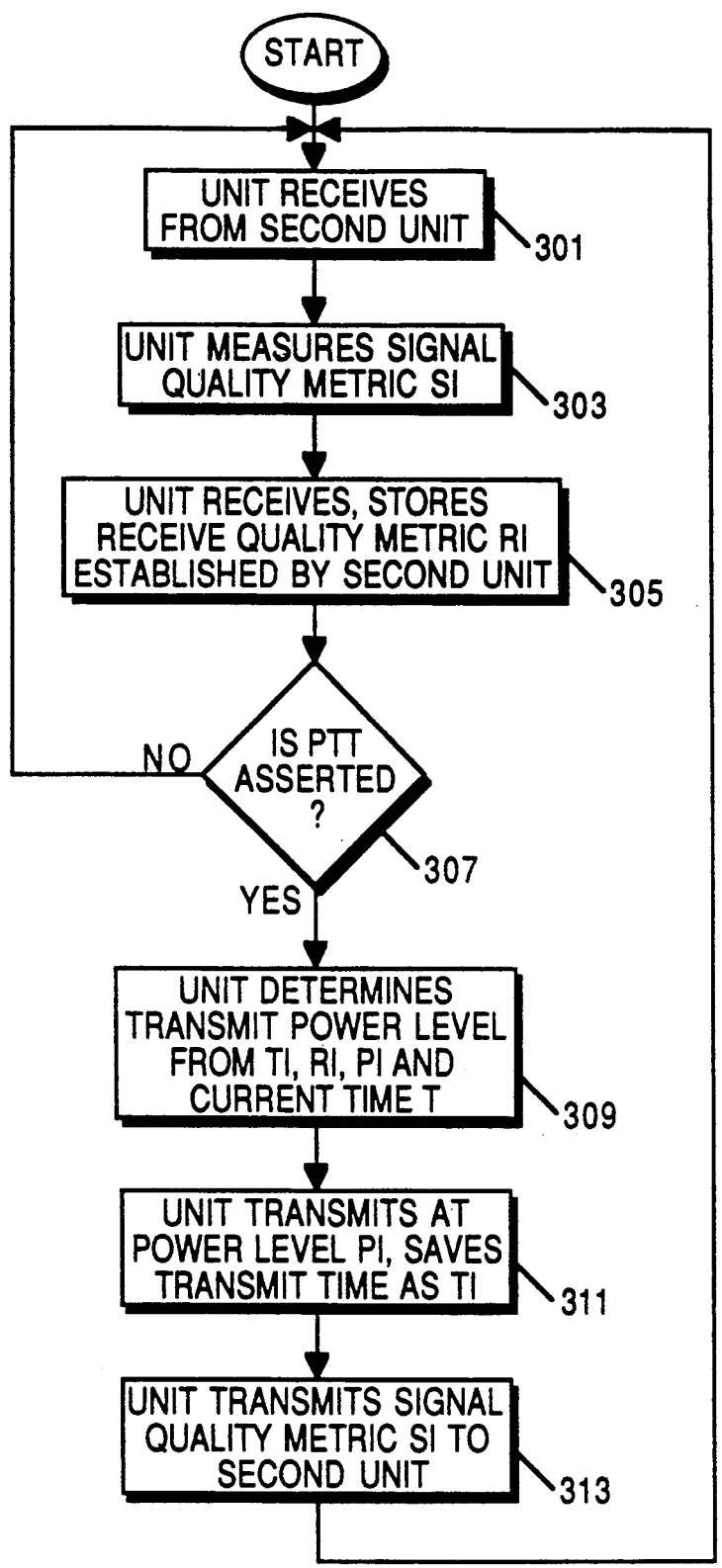
FIG. 3 is a flowchart showing transmission of a message with transmit power level determined in accordance with the invention.
Figure 4:
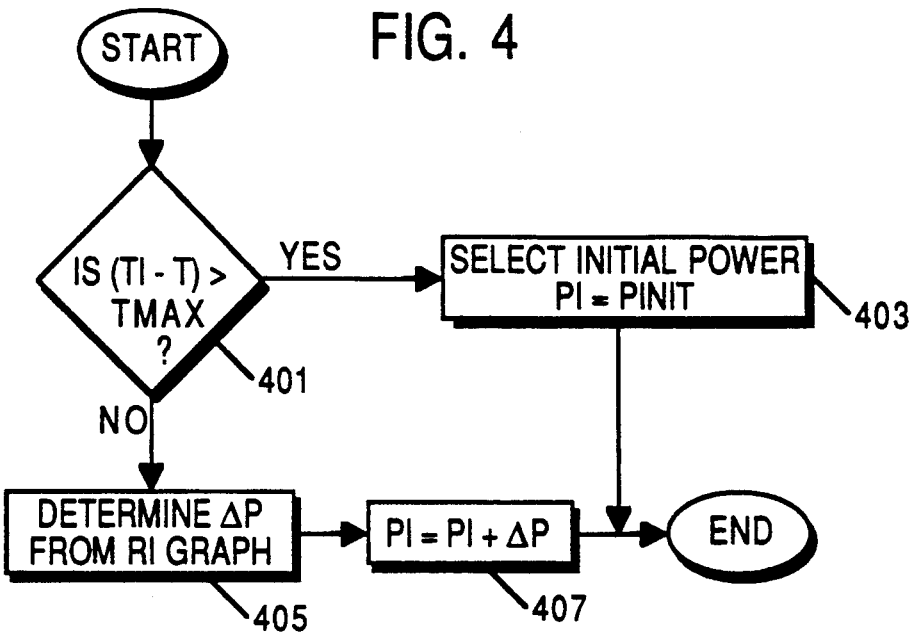
FIG. 4 is a flowchart showing determination of transmit power level in accordance with the invention.

Referring now to FIG. 2, a block diagram of a portable unit (200) is shown that performs the operations in the flowcharts of FIG. 3 and FIG. 4. Although a digital radio is shown, application of this invention to an analog radio will remain successful. This unit 200 includes generally a microphone 201 for receiving an audible voice message to be transmitted, and for providing a push-to-talk (PTT) signal to a host computer 207, such as an MC68HC11 microprocessor, available from Motorola, Inc., the latter being in accordance with well understood prior art technique. The transduced output of the microphone 201 comprises an analog signal representing the voice input, and passes through an appropriate analog to digital converter 203, which digitizes this information and provides the digital representation to a digital signal processor (DSP) 205, such as a DSP56000 available from Motorola, Inc. The DSP 205 is programmed as appropriate to effectuate a desired voice encoding methodology.

The DSP 205 produces as its output a plurality of discrete packets, wherein each packet contains information representing a portion of the original speech information. These packets are provided to an appropriate radio frequency (RF) unit 209, which uses the packet information to modulate an appropriate carrier signal, which carrier signal is then radiated from an appropriate antenna 211, all as known in the art.

Both the DSP 205 and the RF unit 209 are controlled, at least in part, by the host computer 207. In particular, so configured, the host 207 detects conclusion of a voice message by detecting appropriate manipulation of the PTT switch on the microphone 201. In response thereto, the microprocessor 207 signals the RF unit 209 to terminate transmission activity.

The receiver portion of the portable communication unit uses the antenna 211 for receiving the carrier signal and the receive section of the RF unit 209 for receiving this signal and demodulating it to retrieve the discrete packets as sourced by the transmitter. These recovered packets are provided to the DSP 205 that has been appropriately programmed to reconstruct the original voice information based upon the voice packet information. These packets have interleaved therewith signalling information, including the bits of a selected error-control coding scheme. The DSP 205 provides the latter information to the microprocessor 207.

The output of the DSP 205 comprises a digitized representation of the original voice message. This output passes through an appropriate digital to analog converter 213 and then to a power amplifier 215. The latter amplifies the reconstructed analog voice information, and a speaker 217 then renders this information audible.

Transmission of a message with transmit power level determined in accordance with the invention is shown in the flowchart of FIG. 3. At step 301, a portable communication unit ("first unit") 101 of FIG. 1 receives or waits to receive a possible message from another communication unit ("second unit"), either a base station 103 or another portable 107. At step 303, the first unit measures a signal quality metric, SI, of any message received at step 301. This signal quality metric includes values of bit error rate (BER) measurements, received signal strength measurements (RSS), or other such measurements, as are well known in the art. Included in the message received at step 301 should be a receive quality metric, RI, from the second unit. This receive quality metric is established by the second unit based on the reception of the message previously transmitted by the first unit 101 and includes, for example, values of BER measurements, received signal strength measurements, error detection indications, and so forth. At step 305, the first unit 101 receives and then stores the receive quality metric established by the second unit 103 or 107.

If at step 307 the PTT on the first unit is not asserted, the process continues with step 301. If at step 307 the PTT on the first unit is asserted, the first unit determines, according to the steps in the flowchart of FIG. 4, the first unit's transmit power level from TI (the time of the previous transmission by the first unit 101), RI, PI (the power level of the previous transmission), and the current time T at step 309.

The first unit transmits at step 311 at the transmit power level PI determined in step 309 and stores the transmit time as time value TI. At step 313, the first unit 101 includes in its transmission the signal quality metric, SI, measured in step 303.

A further enhancement to this procedure includes transmission of a brief test signal to obtain a more current RI, TI, and SI for the next message transmission. A brief test signal transmitted immediately before the message of interest causes the current channel conditions to be known to the transmitting unit. This procedure drains little power since it is milliseconds in duration, but provides valuable information to insure that the desired communication is received with minimal interference.

A flowchart showing determination of transmit power level is set forth in FIG. 4, as is performed by the portable unit (first unit) in step 309. If at step 401, TI−T is greater than TMAX (a predetermined value stored in the unit that reflects a maximum time period between communications in which the power level is not adjusted due to time considerations) the process continues with step 403. (As a further enhancement, the unit may also select to consider TI−T greater than TMAX if an RI value is not received from the other unit within a certain time.) Time between successive transmissions is considered when selecting the power level because a portable unit may have travelled a significant distance between transmissions, e.g., if the operator goes to lunch, hence the quality metric data will not reflect the current situation of the unit. Likewise, the channel may be subject to various changes over long time spans, such as weather or heavy traffic in other systems, that may adversely affect a transmission if not accounted for.

At step 403, the unit selects for the transmit power level PI the initial power level of the radio, PINIT, as stored in the unit. The value of PINIT may be the maximum power level at which the unit can transmit, or it may be a lower level chosen to minimize power consumption based on average required power level in the system. In the preferred embodiment, PINIT is half of the maximum power capability of the portable unit. If at step 401 TI−T is not greater than TMAX, the process continues with step 405. At step 405, $\Delta P$ is determined from the curve of FIG. 5 based on the value of RI, where RMIN is a predetermined value or set of values of minimum acceptable receive quality metric. At step 407, PI is found by taking the previous value of PI and adding $\Delta P$ to produce the transmit power level, and the process ends. In this fashion, the lowest transmit power level is chosen which gives acceptable values for signal quality metric, receive quality metric, and time between transmissions.

Figure 5:
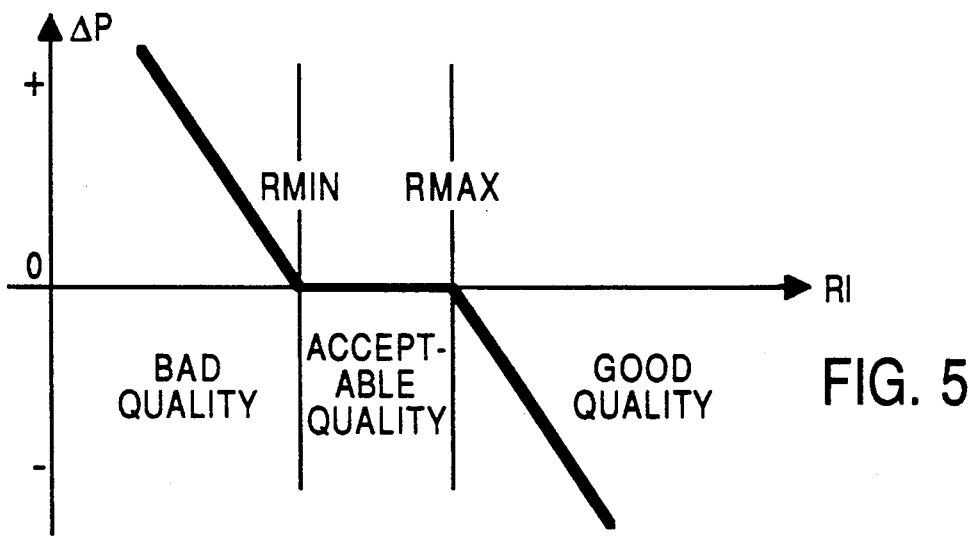
FIG. 5 is a graph showing power level change versus receive quality metric in accordance with the invention.

Referring now to FIG. 5, a graph showing power level change versus receive quality metric is shown. RI may represent BER or RSS, as optimized for the particular system. The graph shows a decreasing function for RI less than predetermined value RMIN, a flat line for RMIN≦RI≦RMAX, and a further decreasing function for RI greater than predetermined value RMAX. The values of RMIN and RMAX are optimized for the system, where the values RMIN≦RI≦RMAX reflect acceptable receive quality metric values. When RI is greater than RMAX, indicating that the receive quality metric is good, i.e., better than acceptable, $\Delta P$ is a negative value, resulting in the transmit power level being decreased, hence a savings in battery consumption is realized. When RI is less than RMIN, indicating that the receive quality metric is bad, i.e., less than acceptable, $\Delta P$ is a positive value, resulting in the power level being increased to maintain good reception of communications. Values for $\Delta P$ are optimized to reflect system performance and account for the minimum and maximum transmit power level of the portable unit.

Figure 6:
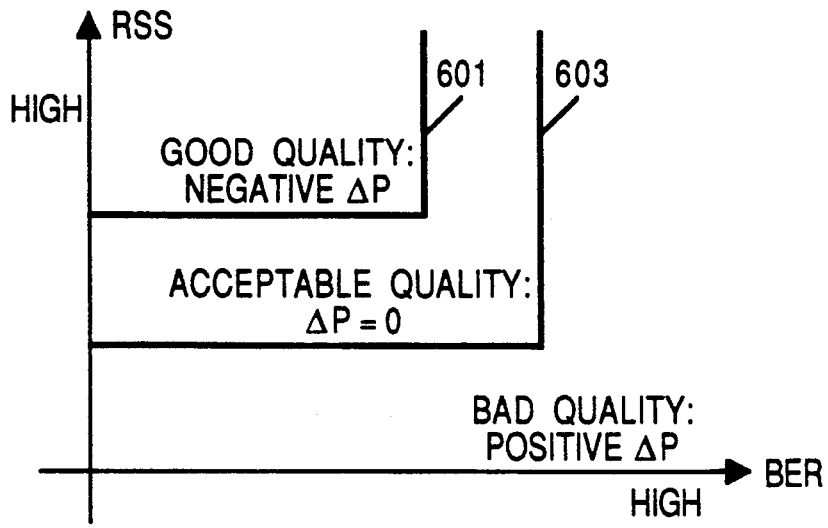
FIG. 6 is a graph showing received signal strength versus bit error rate in accordance with the invention.

Referring now to FIG. 6, a graph shows received signal strength versus bit error rate. As a further enhancement of the graph in FIG. 5, FIG. 6 combines RSS and BER to determine ΔP. FIG. 6 shows a first contour 601, above and to the left of which the signal quality is good, and negative ΔP is realized, allowing for the best opportunity to saving battery charge. The first contour 601 is defined by a maximum BER, e.g., 1% BER, and a minimum RSS, e.g., −60 dBm. One or more negative ΔP values may be assigned in order to minimize power consumption and maximize receive quality. For example, if BER<0.1% and RSS>−40 dBm, ΔP may be assigned the value −5 dB, and all other values between these BER and RSS values and 1% BER and RSS=−60 dBm would reflect a ΔP of −1 dB.

FIG. 6 also shows a second contour 603, below and to the right of which the signal quality is bad, and positive ΔP is realized, not allowing for the opportunity to save battery charge. The second contour 603 is defined by a minimum BER, e.g., 5% BER, and a maximum RSS, e.g., −90 dBm. One or more positive ΔP values may be assigned in order to minimize power consumption and maximize receive quality. For example, if BER<10% and RSS>−110 dBm, ΔP may be assigned the maximum ΔP value, e.g. +10 dB, and all other values between these BER and RSS values and 5% BER and RSS=−90 dBm would reflect a ΔP of +1 dB.

Values for ΔP in FIG. 6 are also optimized to reflect system performance and account for the minimum and maximum transmit power level of the portable unit.

Receive quality metrics are measured and exchanged between a portable communication unit and another communication unit to allow a portable communication unit to transmit at lower transmit power levels, thus providing battery savings that extends battery usage time in a portable unit without use of an additional channel.

Figure 7:
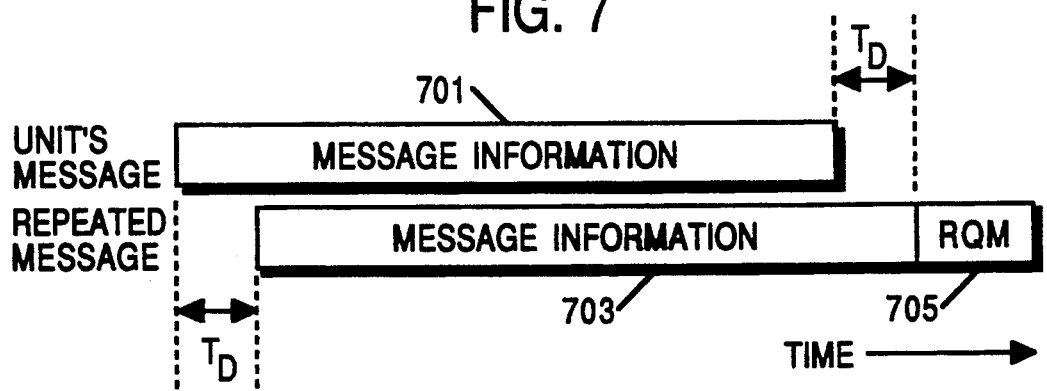
FIG. 7 is a timing diagram showing a repeated message and appending of a receive quality metric in accordance with the invention.

In addition to direct portable-to-portable communications, a portable unit 101 may also engage in indirect communications with another unit 107, through a base station or repeater 103, as shown in FIG. 1B. When engaged in such indirect communications, the portable unit 101 transmits a message 701, as shown in FIG. 7, on a first communication channel to a repeater 103. The repeater 103 receives the message 701 on the first channel and repeats the message 703 on a second communication channel. The message 701 may contain an end-of-message marker at the end of the message, to notify receiving devices, such as repeaters or other communication units, that there is no more message information to be transmitted. Because of the inherent delay between transmitting and receiving the message 701, and if necessary buffering the message 701 to provide any detection, reliability measurement, or other such analysis, there is a time delay between the transmission of the message 701 by the unit 101 at a first time and the repeated transmission of the message 703 by the repeater 103 at a second time. The time between the first time and the second time is the delay time, $T_D$. While receiving the message 701 from the portable unit 101, the repeater 103 establishes a receive quality metric on the message 701, as previously described. The repeater 103 transmits the receive quality metric (RQM) 705 after all the message has been repeated. If the system so provides, end of message (EOM) information may be transmitted after the receive quality metric 705 is transmitted, but such information is not necessary to practice the present invention. Once the portable unit 101 has completed transmission of the message, it has the amount of time, $T_D$, to tune its receiver to the second communication channel so that it may receive the receive quality metric 705 as transmitted by the repeater 103 after the repeated message 703.

Figure 8:
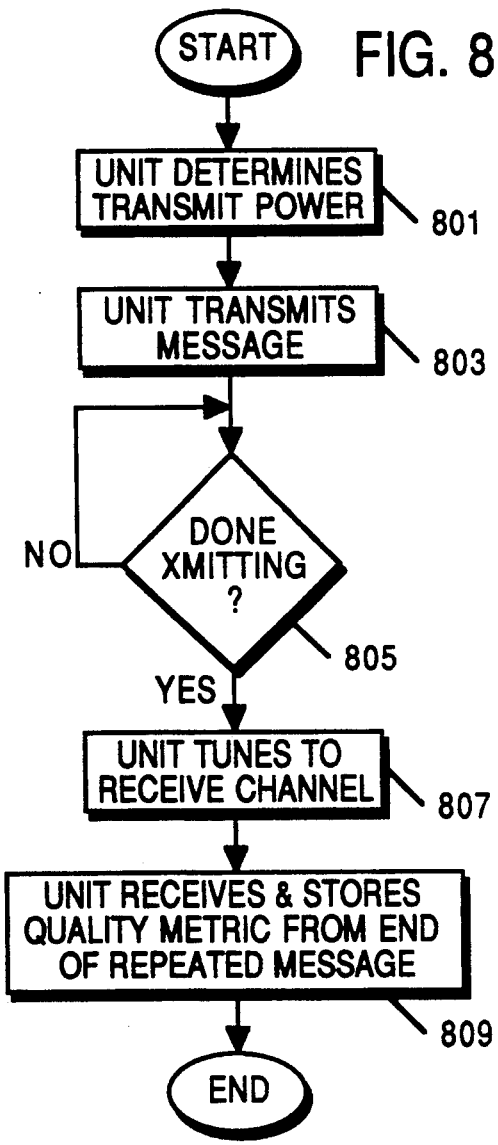
FIG. 8 is a flowchart showing communication unit operation when obtaining a receive quality metric in accordance with the invention.

A flowchart showing communication unit operation when obtaining a receive quality metric is shown in FIG. 8. The portable unit 101 determines its transmit power at step 801 and transmits a message 701 on a first channel at that power at step 803. When the unit is done transmitting (xmitting) the message 701 at step 805, the unit 101 tunes to a second, or receive, channel at step 807, where the unit receives and stores a receive quality metric 705 from the end of the repeated message at step 809, and the procedure ends.

Figure 9:
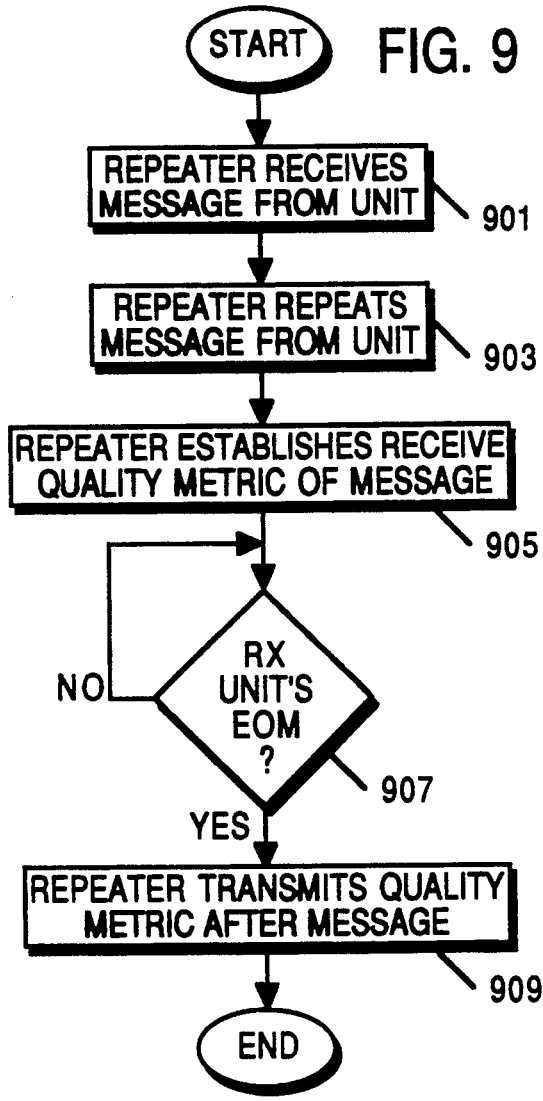
FIG. 9 is a flowchart showing repeater operation when providing a receive quality metric in accordance with the invention.

A flowchart showing repeater operation when providing a receive quality metric is shown in FIG. 9. The repeater 103 receives the message 701 from the unit 101 at step 901. The repeater 103 repeats the message 703 at step 903. The repeater establishes a receive quality metric of the message 701 at step 905. When the repeater 103 receives (rx) the end of the message (EOM) from the unit at step 907, the repeater 103 transmits the receive quality metric 705 after the message 703 is transmitted at step 909, and the procedure ends.

Thus, by providing the receive quality metric 705 at the end of the repeated message, the present invention allows for receipt of a receive quality metric without using an additional channel or transmitting an additional message to the unit. Hence, economy of channel usage and transmission time is achieved while providing the advantage of having signal quality measurements substantially immediately after a message is transmitted by the portable unit 101.

What is claimed is:

1. A method of reducing power consumption in a portable communication unit, comprising the steps of:
   transmitting at a first time, by the portable communication unit, a first message at a first transmit power level to a repeater on a first communication channel;
   repeating at a second time, which second time is later than said first time, by said repeater, said first message, thereby transmitting a delayed message on a second communication channel;
   tuning the portable communication unit to said second communication channel after transmitting all of said first message, so as to receive at least part of said delayed message;
   establishing a receive quality metric for said first message at said repeater;
   transmitting said receive quality metric appended to the end of said delayed message after all of said delayed message has been repeated;
   receiving and storing in the portable communication unit said receive quality metric; and
   determining, by the portable communication unit, a second transmit power level for transmitting a second message, said determining step using said stored receive quality metric.

2. The method of claim 1, wherein said determining step further comprises the steps of:
   computing a time value from transmission of said first message to transmission of said second message; and
   setting said second transmit power level to an initial power level when said time value has a first relationship with respect to a predetermined value.

3. The method of claim 1, wherein said receive quality metric represents a bit error rate measurement and wherein said determining step further comprises the step of decreasing said first transmit power level to produce said second transmit power level when said bit error rate measurement has a first relationship with respect to a predetermined value.

4. The method of claim 1, wherein said receive quality metric represents a bit error rate measurement and wherein said determining step further comprises the step of increasing said first transmit power level to produce said second transmit power level when said bit error rate measurement has a second relationship with respect to a predetermined value.

5. The method of claim 1, wherein said receive quality metric represents a received signal strength measurement and wherein said determining step further comprises the step of decreasing said first transmit power level to produce said second transmit power level when said received signal strength measurement has a first relationship with respect to a predetermined value.

6. The method of claim 1, wherein said receive quality metric represents a received signal strength measurement and wherein said determining step further comprises the step of increasing said first transmit power level to produce said second transmit power level when said received signal strength measurement has a second relationship with respect to a predetermined value.

7. The method of claim 1, further comprising the steps of:
computing a signal quality metric for said receive quality metric; and
decreasing said second transmit power level when said receive quality metric has a first relationship with respect to a predetermined value.

8. The method of claim 1, further comprising the steps of:
computing a signal quality metric for said receive quality metric; and
increasing said second transmit power level when said receive quality metric has a second relationship with respect to a predetermined value.

9. The method of claim 1, wherein said receive quality metric represents a bit error rate measurement and a received signal strength measurement and wherein said determining step further comprises the step of decreasing said first transmit power level to produce said second transmit power level when said bit error rate measurement has a first relationship with respect to a first predetermined value and said received signal strength measurement has said first relationship with respect to a second predetermined value.

10. The method of claim 1, wherein said receive quality metric represents a bit error rate measurement and a received signal strength measurement and wherein said determining step further comprises the step of increasing said first transmit power level to produce said second transmit power level when said bit error rate measurement has a second relationship with respect to a first predetermined value and said received signal strength measurement has said second relationship with respect to a second predetermined value.

11. A portable communication unit, comprising:
means for transmitting at a first time a first message at a first transmit power level to a repeater on a first communication channel;
means for tuning to a second communication channel after transmitting all of said first message, so as to receive at least part of a delayed message, which is comprised of said first message transmitted at a second time on said second communication channel;
means for receiving a receive quality metric from said repeater, wherein said receive quality metric, appended to the end of said delayed message, is transmitted after all of said first message is transmitted;
means for storing said receive quality metric; and
means, coupled to said means for storing, for determining a second transmit power level for transmitting a second message, said determining means using said receive quality metric.

12. The portable communication unit of claim 11, wherein said means for determining comprises:
means for computing a time value from transmission of said first message to transmission of said second message; and
means for setting said second transmit power level to an initial power level when said time value has a first relationship with respect to a predetermined value.

13. The portable communication unit of claim 11, wherein said receive quality metric represents a bit error rate measurement and wherein said determining means further comprises means for decreasing said first transmit power level to produce said second transmit power level when said bit error rate measurement has a first relationship with respect to a predetermined value.

14. The portable communication unit of claim 11, wherein said receive quality metric represents a bit error rate measurement and wherein said determining means further comprises means for increasing said first transmit power level to produce said second transmit power level when said bit error rate measurement has a second relationship with respect to a predetermined value.

15. The portable communication unit of claim 11, wherein said receive quality metric represents a received signal strength measurement and wherein said determining means further comprises means for decreasing said first transmit power level to produce said second transmit power level when said received signal strength measurement has a first relationship with respect to a predetermined value.

16. The portable communication unit of claim 11, wherein said receive quality metric represents a received signal strength measurement and wherein said determining means further comprises means for increasing said first transmit power level to produce said second transmit power level when said received signal strength measurement has a second relationship with respect to a predetermined value.

17. The portable communication unit of claim 11, further comprising:
means for computing a signal quality metric for said received receive quality metric; and
means for decreasing said second transmit power level when said receive quality metric has a first relationship with respect to a predetermined value.

18. The portable communication unit of claim 11, further comprising:
means for computing a signal quality metric for said received receive quality metric; and
means for increasing said second transmit power level when said receive quality metric has a second relationship with respect to a predetermined value.

19. The portable communication unit of claim 11, wherein said receive quality metric represents a bit error rate measurement and a received signal strength measurement and wherein said determining means further comprises means for decreasing said first transmit power level to produce said second transmit power level when said bit error rate measurement has a first relationship with respect to a first predetermined value and said received signal strength measurement has said first relationship with respect to a second predetermined value.

20. The portable communication unit of claim 11, wherein said receive quality metric represents a bit error rate measurement and a received signal strength measurement and wherein said determining means further comprises means for increasing said first transmit power level to produce said second transmit power level when said bit error rate measurement has a second relationship with respect to a first predetermined value and said received signal strength measurement has said second relationship with respect to a second predetermined value.

* * * * *